(12) United States Patent
Regier et al.

(10) Patent No.: US 11,651,060 B2
(45) Date of Patent: May 16, 2023

(54) MULTI-FACTOR FINGERPRINT AUTHENTICATOR

(71) Applicant: International Business Machines Corporation, Armonk, NY (US)

(72) Inventors: Daniela Regier, New Paltz, NY (US); Vijai Kalathur, Wappingers Falls, NY (US); James A. O'Connor, Ulster Park, NY (US); John Kosowsky, Pleasant Valley, NY (US); Vivian Di Tore, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 16/951,052

(22) Filed: Nov. 18, 2020

(65) Prior Publication Data
US 2022/0156352 A1    May 19, 2022

(51) Int. Cl.
*G06F 21/32* (2013.01)
*G06F 21/60* (2013.01)
*G06V 40/50* (2022.01)
*G06V 40/12* (2022.01)

(52) U.S. Cl.
CPC ............ *G06F 21/32* (2013.01); *G06F 21/602* (2013.01); *G06F 21/604* (2013.01); *G06V 40/1353* (2022.01); *G06V 40/50* (2022.01); *G06F 2221/2141* (2013.01)

(58) Field of Classification Search
CPC ...... G06F 21/32; G06F 21/602; G06F 21/604; G06F 2221/2141; G06V 40/1353; G06V 40/50

USPC ......................................................... 726/17
See application file for complete search history.

(56) References Cited

U.S. PATENT DOCUMENTS

| | | | |
|---|---|---|---|
| 6,167,517 | A | 12/2000 | Gilchrist et al. |
| 6,487,306 | B1 | 11/2002 | Jain et al. |
| 6,718,467 | B1 | 4/2004 | Trostle |
| 8,224,064 | B1 | 7/2012 | Hassebrook et al. |
| 8,464,058 | B1 | 6/2013 | Chen et al. |
| 8,838,990 | B2 | 9/2014 | Boult et al. |
| 10,594,688 | B2 | 3/2020 | Yang et al. |

(Continued)

FOREIGN PATENT DOCUMENTS

| | | |
|---|---|---|
| CN | 101764823 A | 6/2010 |
| CN | 103152318 A | 6/2013 |

(Continued)

OTHER PUBLICATIONS

Cappelli, R. et al., "Fingerprint Image Reconstruction from Standard Templates," Sep. 2007, IEEE Transactions on Pattern Analysis and Machine Intelligence, vol. 29, No. 9, 15 pages.

(Continued)

*Primary Examiner* — Jacob Lipman
(74) *Attorney, Agent, or Firm* — Cantor Colburn LLP; Teddi Maranzano

(57) ABSTRACT

Techniques for client side multi-factor password generation include randomly removing one or more features of a record of a fingerprint image of a user and creating a distorted record of the fingerprint image by merging the record with a user input code using an encryption technique, the distorted record being reversible using the user input code. The distorted record for authentication of the user is registered.

20 Claims, 15 Drawing Sheets

(56) References Cited

U.S. PATENT DOCUMENTS

| | | | | |
|---|---|---|---|---|
| 2002/0184509 A1* | 12/2002 | Scheidt | ................... | G06F 21/31 |
| | | | | 713/168 |
| 2003/0039382 A1* | 2/2003 | Yau | ...................... | G06V 10/993 |
| | | | | 382/125 |
| 2010/0142763 A1* | 6/2010 | Beatson | ................. | G06V 40/30 |
| | | | | 382/293 |
| 2011/0126024 A1* | 5/2011 | Beatson | ................ | H04L 9/3226 |
| | | | | 713/186 |
| 2011/0302420 A1* | 12/2011 | Davida | .................. | G06V 40/10 |
| | | | | 713/180 |
| 2012/0218079 A1* | 8/2012 | Kim | ........................ | G06F 21/32 |
| | | | | 340/5.82 |
| 2018/0234414 A1 | 8/2018 | Littrell | | |
| 2019/0065716 A1 | 2/2019 | Lavin | | |

FOREIGN PATENT DOCUMENTS

| | | |
|---|---|---|
| CN | 105553923 A | 5/2016 |
| CN | 109067766 A | 12/2018 |

OTHER PUBLICATIONS https://en.wikipedia.org/wiki/Avalanche_effect; retrieved Oct. 15, 2020, 2 pages.

Patrick Lacharme & Aude Plateaux, "PIN-Based Cancelable Biometrics," International Journal of Automated Identification Technology (IJAIT), 2011, 3(2), pp. 75-79.

Siswanto, A., et al., "Fingerprint Template Protection Schemes: A Literature Review," May 31, 2018, Journal of Theoretical and Applied Information Technology, vol. 96, No. 10, 18 pages.

Williams, E., "Your Unhashable Fingerprints Secure Nothing," Nov. 10, 2015, retrieved Oct. 15, 2020, 45 pages; https://hackaday.com/2015/11/10/your-unhashable-fingerprints-secure-nothing/.

Woodford, C., "Biometric fingerprint scanners," Sep. 20, 2019, retrieved Oct. 15, 2020, 6 pages; https://www.explainthatstuff.com/fingerprintscanners.html.

International Search Report; International Application No. PCT CN2021/123644; International Filing Date: Oct. 13, 2021; dated Jan. 13, 2022; 9 pages.

Galbally, "Fake Fingertip Generation from a Minutiae Template", IEEE, 9th International Conference on Pattern Recognition (ICPR 2008), Dec. 8-11, 2008, Tampa, Florida, USA, 5p.

Google search "how many minutiae in an average fingerprint", retrieved Oct. 27, 2022, 2p.

Jin, "A Revocable Fingerprint Template for Security and Privacy Preserving", KSII Transactions on Internet and Information Systems • Dec. 2010, 17p.

JomuTech, [online]; [retrieved on Oct. 28, 2022]; retrieved from the Internethttps://jomutech.com/convertfingerprintimagestoisooransifingerprinttemplateformats.

Yang, "Biometrics Based Privacy-Preserving Authentication and Mobile Template Protection", Hindawi, Wireless Communications and Mobile Computing, vol. 2018, Article ID 7107295, 18p.

Yau, "Benchmarking of Fingerprint Sensors", BioAW 2004, LNCS 3087, p. 91-95, 2004, 5p.

\* cited by examiner

FIG. 6

| Field | | Size | Valid Values and Notes |
|---|---|---|---|
| Record Header | Format ID | 4 bytes | 'F' 'M' 'R' 0 |
| | ... | | |
| | Image Horizontal Size | 2 bytes | in pixels |
| | Image Vertical Size | 2 bytes | in pixels |
| | Horizontal Resolution | 2 bytes | in pixels per cm |
| | Vertical Resolution | 2 bytes | in pixels per cm |
| | Number of Finger Views $n_V$ | 1 byte | 0 to 255 |
| | ... | | |
| Finger Header | Finger Position | 1 byte | 0 to 10 |
| | View Number | 4 bits | 0 to 15 |
| Finger Minutia Record ($n$ instances) | Number of Minutiae $n$ | 1 byte | 0 to 255 |
| | Type | 2 bits | (00=other, 01=termination, 10=bifurcation) |
| | Position x | 14 bits | in pixels |
| | Reserved | 2 bits | |
| | Position y | 14 bits | in pixels |
| | Direction $\theta$ | 1 byte | 0 to 255 (resolution 1.40625 degrees) |
| | Quality | 1 byte | 1 to 100 (0=quality not reported) |
| Extended Data | Extended Data Block Length | 2 bytes | only present if Extended Data Block Length>0 |
| | Extended Data Area Type Code | 2 bytes | |
| | Extended Data Area Length | 2 bytes | (prev. field) |
| | Data Section | (0+ text) | |

Single Finger Record ($n_V$ instances)

Finger Minutiae Record

FIG. 8

| Field | Size | Valid Values and Notes |
|---|---|---|
| Format ID | 4 bytes | 'F' 'M' 'R' 0 |
| ... | | |
| Image Horizontal Size | 2 bytes | in pixels |
| Image Vertical Size | 2 bytes | in pixels |
| Horizontal Resolution | 2 bytes | in pixels per cm |
| Vertical Resolution | 2 bytes | in pixels per cm |
| Number of Finger Views $n_V$ | 1 byte | 0 to 255 |
| Finger Position | 1 byte | 0 to 10 |
| View Number | 4 bits | 0 to 15 |
| ... | | |
| Number of Minutiae $n$ | 1 byte | 0 to 255 |
| Type | 2 bits | {00=other, 01=termination, 10=bifurcation} |
| Position $x$ | 14 bits | in pixels |
| Reserved | 2 bits | |
| Position $y$ | 14 bits | in pixels |
| Direction $\theta$ | 1 byte | 0 to 255 (resolution 1.40625 degrees) |
| Quality | 1 byte | 1 to 100 (0=quality not reported) |
| Extended Data Block Length | 2 bytes | only present if Extended Data Block Length>0 |
| Extended Data Area Type Code | 2 bytes | |
| Extended Data Area Length | 2 bytes | |
| Data Section | (prev. field) | |

Record Header / Finger Header / Finger Minutia Record (n instances) / Extended Data (0+ sets)

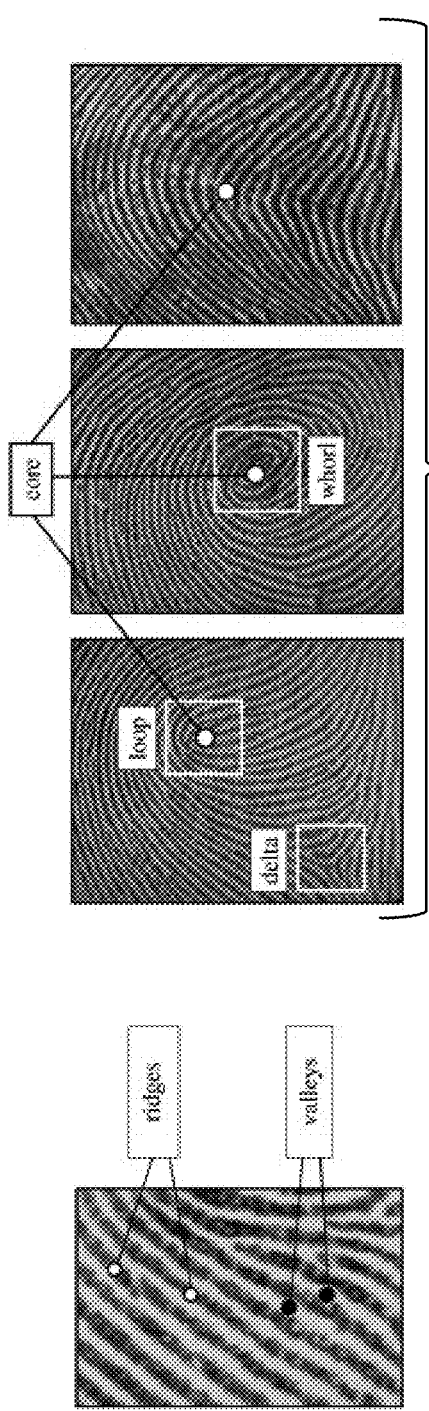
FIG. 11A
FIG. 11B
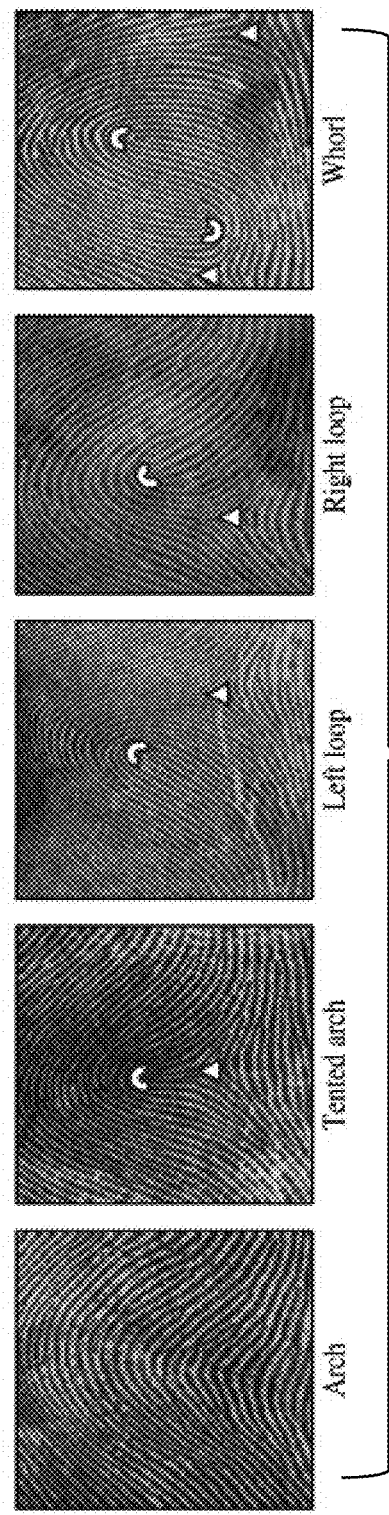
FIG. 12

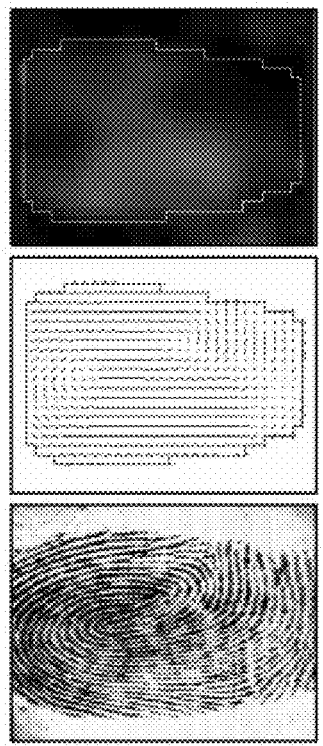
FIG. 13C
FIG. 13B
FIG. 13A
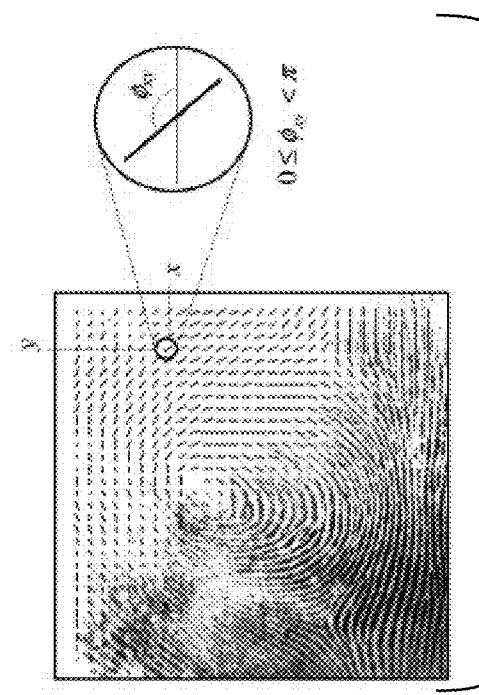
FIG. 14

MULTI-FACTOR FINGERPRINT AUTHENTICATOR

BACKGROUND

The present invention generally relates to computer systems, and more specifically, to computer systems, computer-implemented methods, and computer program products for multi-factor fingerprint authenticator.

Fingerprint-based biometric systems are rapidly gaining acceptance as one of the most effective technologies to authenticate users in a wide range of applications, for example, personal computer (PC) logon, physical access control, cellphone login, etc. A typical fingerprint verification system involves two stages. During enrollment, the user's fingerprint is acquired, and its distinctive features are extracted and stored as a template. During verification, a new fingerprint is acquired and compared to the stored template to verify the user's claimed identity. The distinctive features used by most fingerprint-based systems are the so called minutiae, which are local characteristics of the pattern that are stable and robust to fingerprint impression conditions. With the aim of achieving interoperability among different fingerprint-based recognition systems, an international standard for minutiae template representation has been defined as ISO/IEC 19794-2.

SUMMARY

Embodiments of the present invention are directed to multi-factor fingerprint authenticator. A non-limiting example computer-implemented method includes randomly removing one or more features of a record of a fingerprint image of a user and creating a distorted record of the fingerprint image, the creating including merging the record with a user input code using an encryption technique, the distorted record being reversible using the user input code. Also, the method includes registering the distorted record for authentication of the user.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts an example fingerprint minutiae record based on analyzing the fingerprint image in accordance with one or more embodiments of the present invention;

FIG. 8 depicts a partial view of an example fingerprint minutiae record where block arrows highlight fields that can be selected for scrambling in accordance with one or more embodiments of the present invention;

FIG. 11A depicts ridges and valleys on a fingerprint image in accordance with one or more embodiments of the present invention;

FIG. 11B depicts singular regions and core points in fingerprint images in accordance with one or more embodiments of the present invention;

FIG. 12 depicts example fingerprint classes in accordance with one or more embodiments of the present invention;

FIG. 13A depicts a fingerprint image in accordance with one or more embodiments of the present invention;

FIG. 13B depicts an orientation image of the fingerprint image in FIG. 13A in accordance with one or more embodiments of the present invention FIG. 13C depicts a frequency image of the fingerprint image in FIG. 13A in accordance with one or more embodiments of the present invention;

FIG. 14 depicts a fingerprint image faded into the corresponding orientation image in accordance with one or more embodiments of the present invention;

DETAILED DESCRIPTION

One or more embodiments of the invention generate a long password for user authentication by incorporating a biometric scanned image translated string with a user provided user password. Particularly, one or more embodiments of the inventions mesh both biometric information and a user password together in a way that the biometric information cannot be easily identified, and if the user password is lost, the user can create a new user password with the same biometric information in order to generate a new long password. The resulting long password has the benefit of sufficient length against unauthorized reproduction while the short user password remains easy to remember because the user only has to remember the user password part (i.e., the short user password).

With the availability of more powerful computers, short length passwords can be comprised. Long passwords are difficult to remember and are avoided by most users. Biometric information, such as fingerprint information, is sensitive and cannot be replaced once it is lost. Although a password manager can help, the password manager still needs a traditional master password to access it.

One or more embodiments of the invention can generate a very long password for enhanced security, in a manner that is easy to remember by using a short user password. No password file has to be stored on a specific user device. In one or more embodiments, no biometric information is required to be transported through Internet or over the network, and no original format of the biometric scanned image (e.g., fingerprint) is stored on any device. Further, one or more embodiments can use existing fingerprint scan methods to obtain the fingerprint image, and the fingerprint image is translated into a string. The user is then prompted for a user code/pin/password which is a short user password. The string representing the fingerprint image and the short user password (i.e., the user code/pin input by the user) can be meshed together using an application defined method such that the resulting string cannot be easily decoded to separate the original parts. As noted herein, no biometric information and/or short user password need to be stored on local side and/or server side. The user only has to recall the short user password part, not the fingerprint part. The user can logon anywhere having scanner and software support for this function. If the short user password was lost and/or comprised, the biometric information is hard to recover by the person attempting to gain unauthorized access. The user can change the long password by modifying the user short password (e.g., input user code/pin), and then the modified user short password can be used with fingerprint to generate a new long password. Additionally, the long password can still be used with any existing password based encryption.

Figure 1:
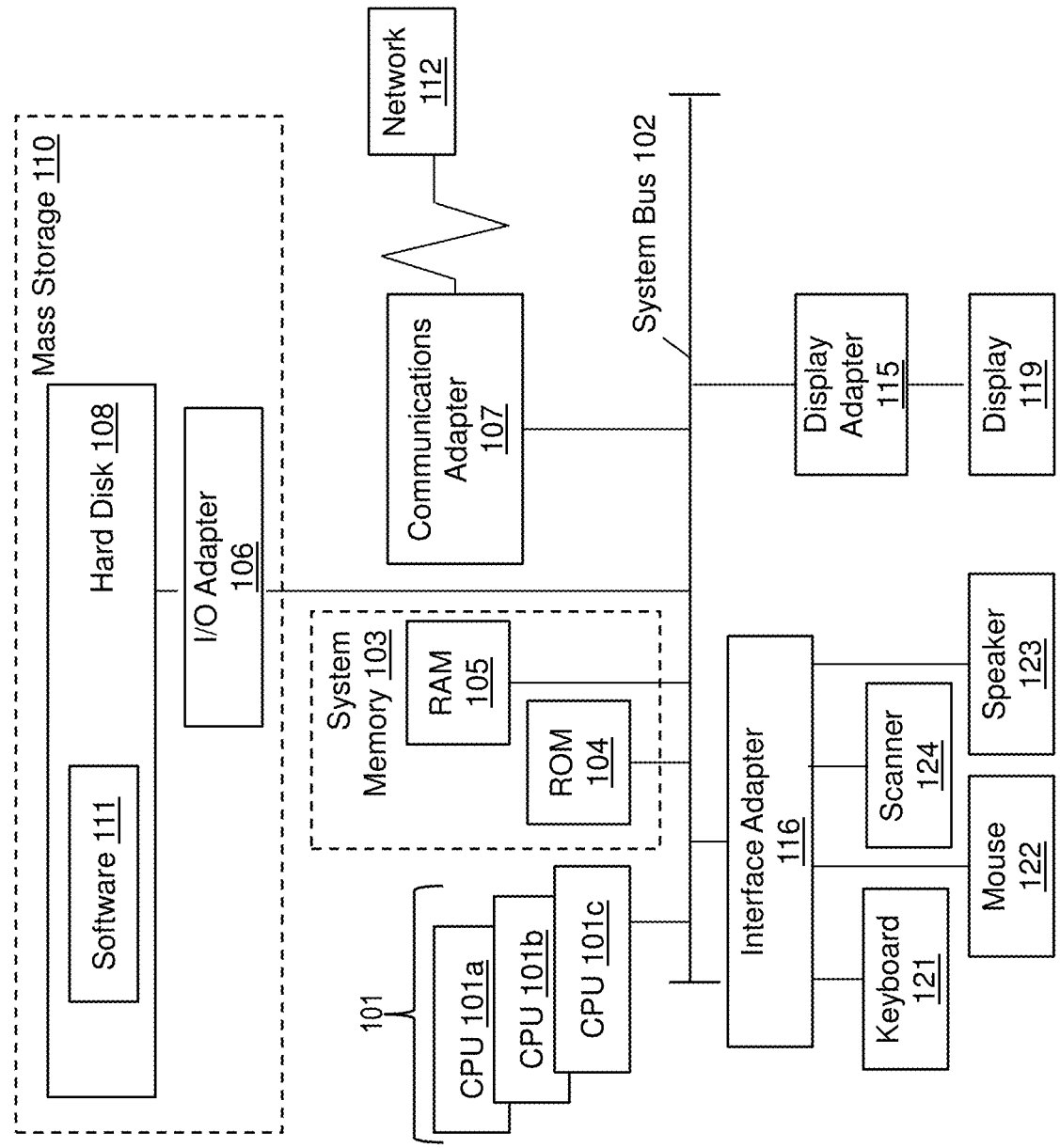
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a fingerprint scanner 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
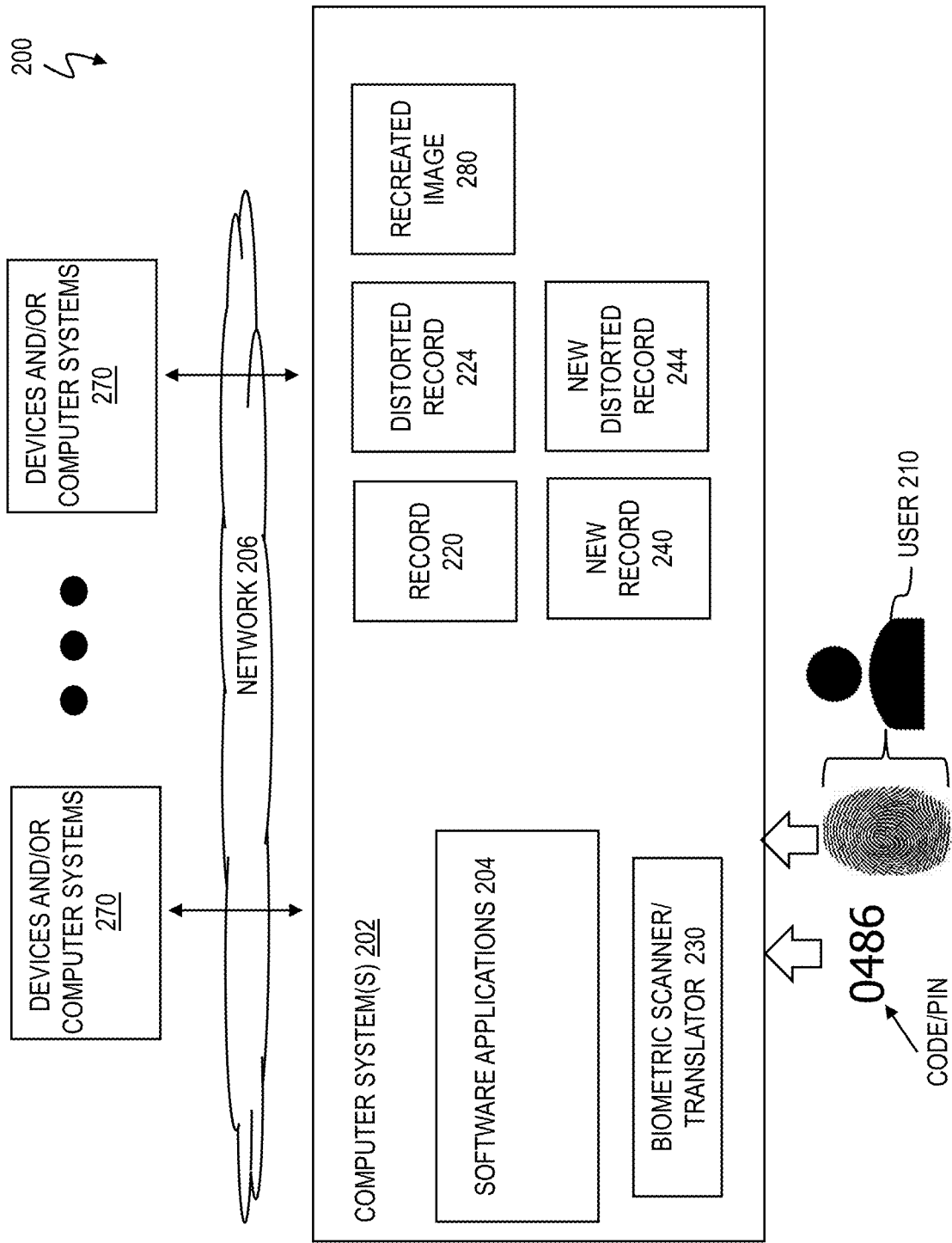
FIG. 2 depicts a block diagram of a system for client side multi-factor password generation, authentication, and/or update for a user in accordance with one or more embodiments of the present invention.

FIG. 2 depicts a block diagram of a system 200 for client side multi-factor password generation, authentication, and/or update for a user in accordance with one or more embodiments of the present invention. FIG. 2 depicts a computer system 202 coupled to one or more other devices and/or computer systems 270. Computer system 202 is configured to generate a long password for the user based on a short user password and biometric information, authenticate the long password upon subsequent input, and/or update the long password at predefined times. After authentication, computer system 202 is configured to grant access to computer system 202, one or more devices and/or computer systems 270, a network, etc. Elements of computer system 100 may be used in and/or integrated into computer system 202 along with devices and/or computer systems 270 to function as discussed herein. In one or more embodiments, computer system 202 may communicate with devices and/or computer systems 270 via wireless and/or wired connections of network 206.

Figure 3:
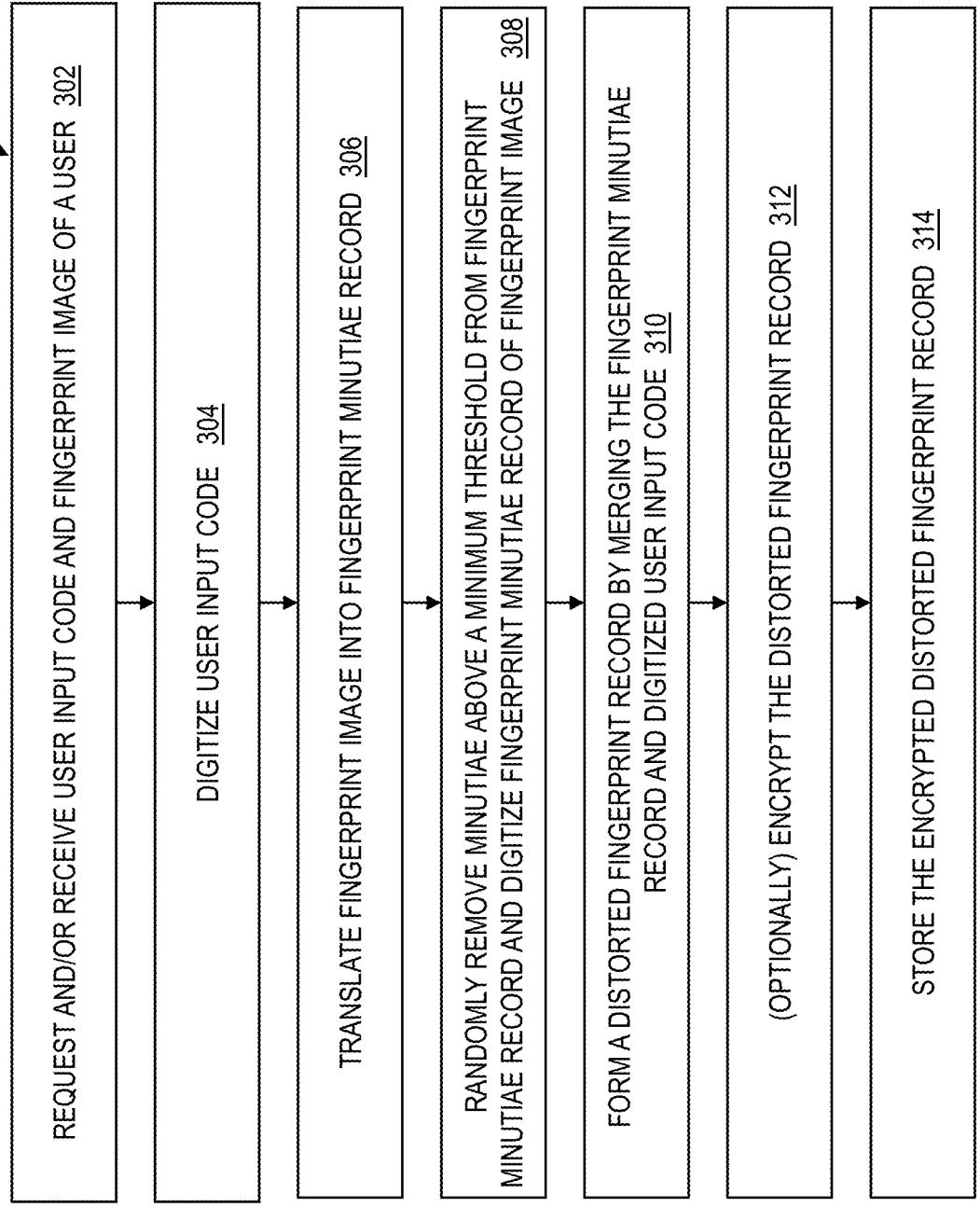
FIG. 3 depicts a flowchart of a process for client side multi-factor password generation for a user in accordance with one or more embodiments of the present invention.

FIG. 3 illustrates a flowchart of a process 300 for client side multi-factor password generation for a user in accordance with one or more embodiments of the present invention. Process 300 in FIG. 3 will be described with reference to FIG. 2. At block 302, software applications 204 on computer system 202 are configured to request and/or receive a user input code/pin and a fingerprint image of a user 210. The user input code, for example, 0486 can be input using any input device including a keyboard, mouse, touchscreen, microphone, etc. A biometric scanner/translator 230 is configured to scan the finger of the user 210 to obtain the fingerprint image via fingerprint scanner 124. Biometric scanner/translator 230 may be integrated with and/or coupled to computer system 202. At block 304, software applications 204 are configured to digitize the user input user code which is the short user password into a string of zeros and ones (e.g., 0's and 1's), as a binary representation. The digitized use input code is used in further operations discussed herein. The user input code can be a short pin, such as four digit code used as the short user password.

At block 306, software applications 204 on computer system 202 are configured to translate the received fingerprint image into fingerprint minutiae record 220 of the fingerprint image. The fingerprint minutiae record can also be referred to as a fingerprint minutiae template or simply a template. FIG. 6 is an example fingerprint minutiae record 220 based on analyzing the fingerprint image and extracting features. The fingerprint minutiae record 220 can utilize the standard under ISO/IEC 19794-2:2005. Software applications 204 can include and/or employ one or more suitable algorithms for analyzing the fingerprint image and extracting minutiae for the fingerprint minutiae record 220 as understood by one skilled in the art.

Figure 7:
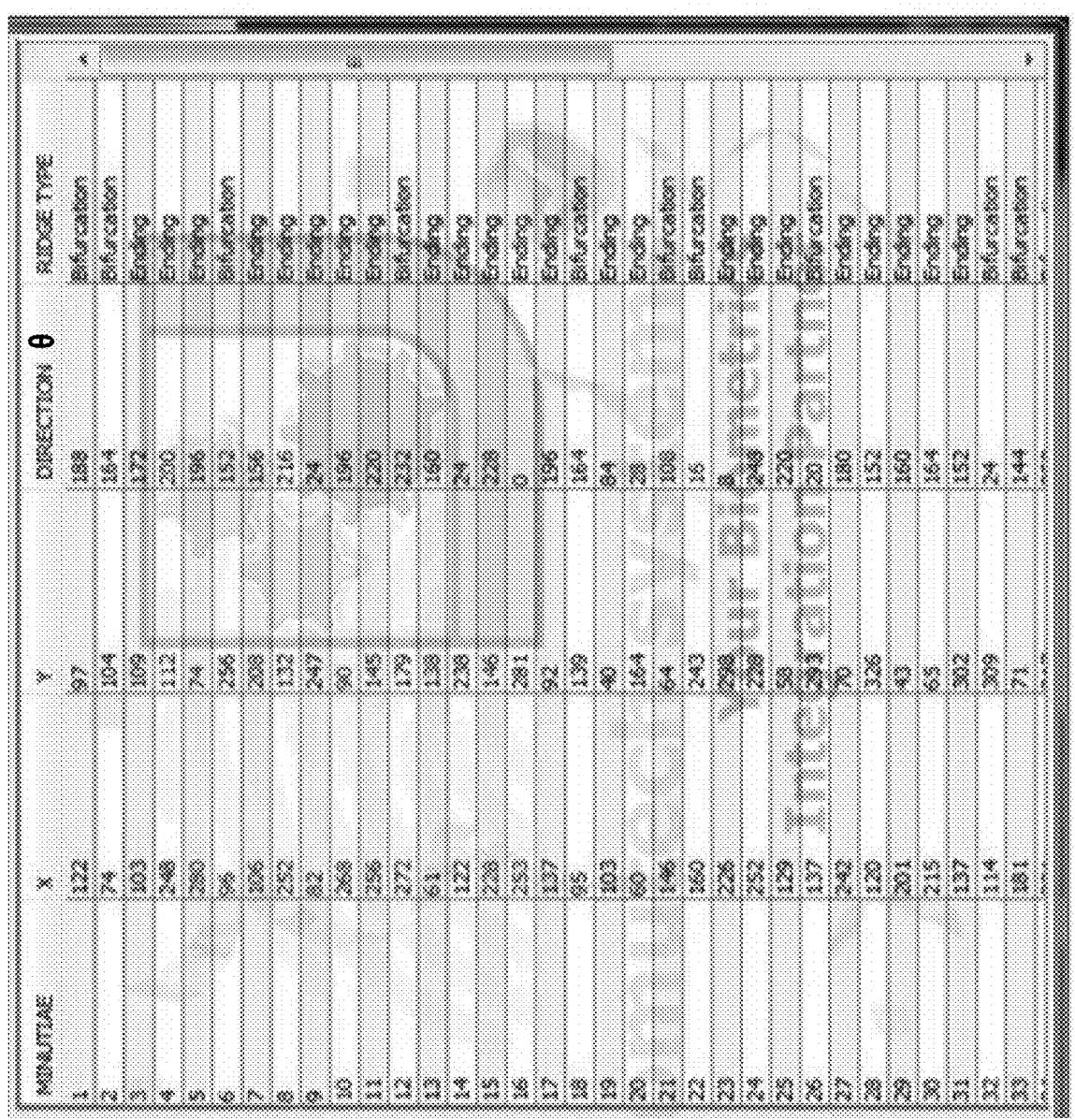
FIG. 7 depicts an example of minutiae fields in the fingerprint minutiae record in FIG. 6 in accordance with one or more embodiments of the present invention.

At block 308, software applications 204 on computer system 202 are configured to randomly remove some of and/or all the minutiae above a minimum minutiae threshold, and subsequently, digitize the fingerprint minutiae record 220. A quality fingerprint image can have 25 to 80 minutiae depending on the fingerprint scanner resolution and the placement of the finger on the sensor. To declare a match between two sets of fingerprints, software applications 204 could find a match between 12 to 20 points (or minutiae). In the fingerprint minutiae record 220, "n" denotes the number of minutiae fields. For instance, FIG. 7 is an example of minutiae fields in fingerprint minutiae record 220. In FIG. 7, each of the minutiae include the X field, Y field, direction, and ridge type. A match between two sets of fingerprints can be declared when, for example, 12 minutiae match. For explanation purposes and not limitation, it may be assumed that 12 minutiae are required to be in common before declaring a match between fingerprints and the example minimum minutiae threshold is 22. Accordingly, software applications 204 are configured to ensure that at least 22 minutiae remain for comparison (later) after randomly removing minutia from the fingerprint minutia record 220. In one example, a given fingerprint minutia record has 25 minutiae, and accordingly, software applications 204 may randomly remove at most 25−22=3 minutiae (or minutiae values) from the fingerprint minutiae record to meet the example minimum minutiae threshold of 22 minutiae. Once the minutiae have been randomly removed, software applications 204 digitize the values of each minutia remaining into strings of zeros and ones (0's and 1's) in the fingerprint minutiae record 220. Dropping or altering some information is a way to further mask the real data by producing more unknowns. The more unknowns, the more difficult it would be to gain unauthorized access. Having a fingerprint minutiae record or fingerprint template, ultimately resulting in a distorted fingerprint minutiae record discussed below, that changes continuously is much harder to gain unauthorized access than if there is a single stored fingerprint template. It is assumed that on average there are 25 minutiae per fingerprint scan, and software applications 204 randomly drop or alter 3 minutiae, then software applications 204 are selecting 3 out of 25 to drop. Accordingly, the number of 3 out of 25 combinations (without regard to order) is: $C=(N!)/[k! (N-k)!]=25!/[3! (22!)]=2300$ combinations. As such, 2300 is a substantial increase in random combinations used to alter the fingerprint minutiae record 220 which will help ensure each of the new fingerprint scans are unique.

Referring to FIG. 3, at block 310, software applications 204 on computer system 202 are configured to form distorted fingerprint minutiae record 224 by merging the fingerprint minutiae record 220 (having minutiae randomly removed) and the digitized user code (i.e., pin or short password). In one or more embodiments, the merging/scrambling can be performed using fixed format encryption, also referred to as format-preserving encryption (FPE), in which encryption is performed such that the output (e.g., the ciphertext) is in the same format as the input (e.g., the plaintext). This makes it much harder for an unauthorized person to use brute force techniques (e.g., rainbow tables, hill climbing, etc.) in an attempt to determine which passcode will undistort the distorted fingerprint minutiae record/template to produce the actual fingerprint minutiae record/template, because all false passcodes will decipher the distorted fingerprint minutiae record/template into what appears to be a legitimate fingerprint minutiae record/template. One of more minutiae fields are scrambled using the user code such that the fingerprint minutiae record 220 becomes the distorted fingerprint minutiae record 224. It should be appreciated that the minutiae fields may be randomly dropped before, after, and/or during scrambling, although randomly dropping before scrambling could be more efficient. Software applications 204 may include and/or employ various algorithms or techniques for scrambling certain fields of the minutiae using the user input code. As an example for explanation purposes, the value of minutiae fields (0-255) is modified based on the input user code (e.g., 0486) to produce a different value 0-255 for the minutiae fields in a way that can be reversed during authentication. For input code 0486 (e.g., selecting "48") and a minutiae field having a value of 115, the scrambling could be 115+48=163. The scrambled value is wrapped back when the scrambled value is greater than (>) 255. If software applications 204 create more minutiae, software applications 204 are configured to also populate the attribute fields. Additionally, and/or alternatively, the x and y minutiae position fields are modified based on the input code (e.g., 0486) to produce different valid positions, again in a way that can be reversed during authentication. Using, for example, a 0-512 value for x-coordinate and 0-512 value for y-coordinate along with using input code 0486, if x is 213 then add 86 to obtain scrambled x value 299, and if y is 24 add 68 to obtain scramble y value 102. Again, if any x value or y value is greater than (>) 512, that value is wrapped. Further, the direction angle minutiae position field (which generally varies from values 0 to 255) can be modified based on the input user code (e.g., 0486) to produce different valid angles analogous to the examples discussed herein. Although straightforward modifications using addition have been discussed for explanation purposes, more complex modifications and operations are contemplated and can be used. Additionally, other fingerprint minutiae fields can be modified as well. In one or more embodiments, the scrambling can be performed slightly different on each user device (e.g., computer system 202). In other words, the distortion/scrambling algorithm has a random seed that makes each device unique by using the minutiae value+user input code+random seed=scrambled minutiae value, and then wrap the scrambled value when there is an overflow above the required value for the minutiae field being scrambled. The devices may use the same algorithm as above but additionally add a device unique field (e.g., unique field=7) for each device. For example, using the unique field and still using example user input code 0486, the scrambling would result in 115+48+7=163+7=170. The device unique field is the random seed.

At blocks 312 and 314, the distorted fingerprint minutiae record 224 is encrypted and stored for future authentication, while the original fingerprint image and fingerprint minutiae record are not stored. Blocks 310 and 312 may be performed separately and/or concurrently. Block 312 may be optional. For example, the encryption algorithm (e.g., such as fixed format encryption) can incorporate the user code in the encryption process, thereby simultaneously or nearly simultaneously scrambling fields of minutiae in fingerprint minutiae record 220 to form distorted fingerprint minutiae record 224 and encrypting the distorted fingerprint minutiae record 224. Software applications 204 may include and/or employ various encryption algorithms that can be decrypted using the user input code. Example algorithms which may serve for encryption and/or scrambling include hash functions, symmetric encryption algorithms, asymmetric encryption algorithms, fixed format encryption, etc. It should be appreciated that the distorted fingerprint minutiae record 224 is a long password representative of the user 210 while the user 210 only has to recall the user input code which is the short password (e.g., four digit pin). The long password is machine-generated and is a result of the fingerprint and the user input code, neither of which is stored on computer system 202.

Figure 4:
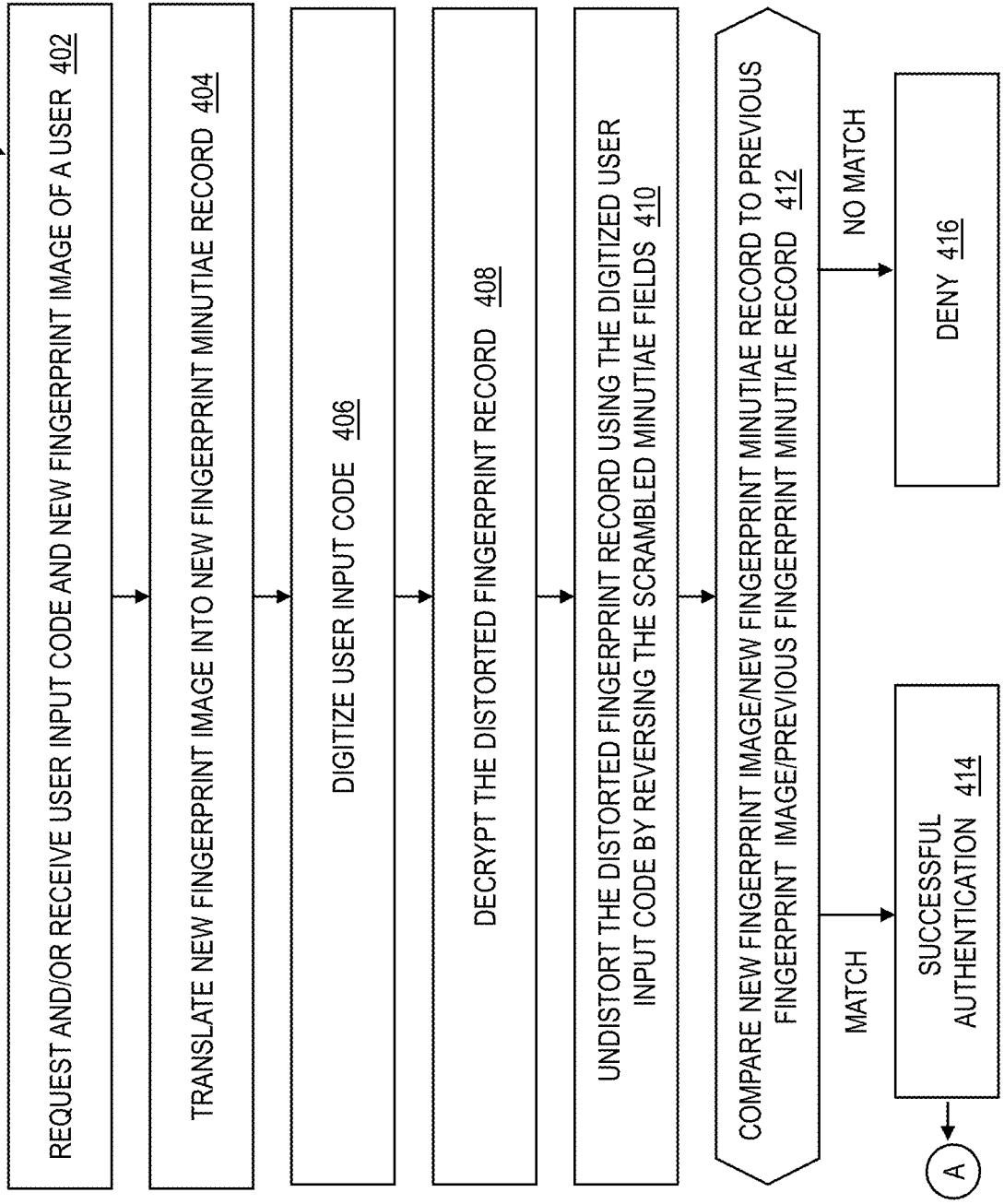
FIG. 4 depicts a flowchart of a process for authentication with client side multi-factor password generation for the user in accordance with one or more embodiments of the present invention.

FIG. 4 illustrates a flowchart of a process 400 for authentication with client side multi-factor password generation for the user in accordance with one or more embodiments of the present invention. Blocks 402, 404, 406 are analogous to previously discussed blocks 302, 304, 306 and will be discussed briefly. In this scenario, the user 210 is requesting access to, for example, computer system 202, devices and/or computer systems 270, network 206, etc., and has to be authenticated before access is granted. At blocks 402, 404, 406, software applications 204 on computer system 202 are configured to receive the user input code and a new fingerprint image of the user 210, translate the new fingerprint image into new fingerprint minutiae record 240, and digitize the user input code. The user input code is required to be the same as the previously input user input code (e.g., 0486). At block 408, software applications 204 on computer system 202 are configured to decrypt the distorted fingerprint minutiae record 224 using the user input code and undistort/descramble the distorted fingerprint minutiae record 224 using the user input code by reversing the operations performed on the scrambled minutiae fields at block 410. In one or more embodiments, blocks 408 and 410 may be performed simultaneously and/or nearly simultaneously, because the decryption technique/algorithm may currently decrypt and undistort/descramble the distorted fingerprint minutiae record 224. Software applications 204 on computer system 202 are configured to use the distorted fingerprint minutiae record 224 to recreate the fingerprint image 280 of user 210 that was previously scanned. Because minutiae were randomly removed from fingerprint minutiae record 220, the recreated fingerprint image 280 has fewer minutiae than the original fingerprint previously obtained while still maintaining minutiae at and/or above the minimum minutiae threshold discussed at block 308. As noted above, a match between two fingerprints can be declared when 12 to 20 points/minutiae match, and in the example scenario, the example minimum minutiae threshold is 22. Accordingly, the recreated fingerprint image 280 has at least 22 minutiae and/or was recreated using at least 22 minutiae values. Software applications 204 may include and/or employ one of more suitable algorithms or techniques to recreate a fingerprint image for a fingerprint minutiae record as understood by one skilled in the art.

Referring to FIG. 4, at block 412, software applications 204 on computer system 202 are configured to compare the new fingerprint image and/or new fingerprint minutiae record 240 to the recreated fingerprint image 280 and/or fingerprint minutiae record 220, respectively. When there is a match, software applications 204 on computer system 202 are configured to determine that the user 210 is successfully authenticated and grant access at block 414. When there is not a match, software applications 204 on computer system 202 are configured to determine there is an unsuccessful authentication and deny access at block 416.

Figure 5:
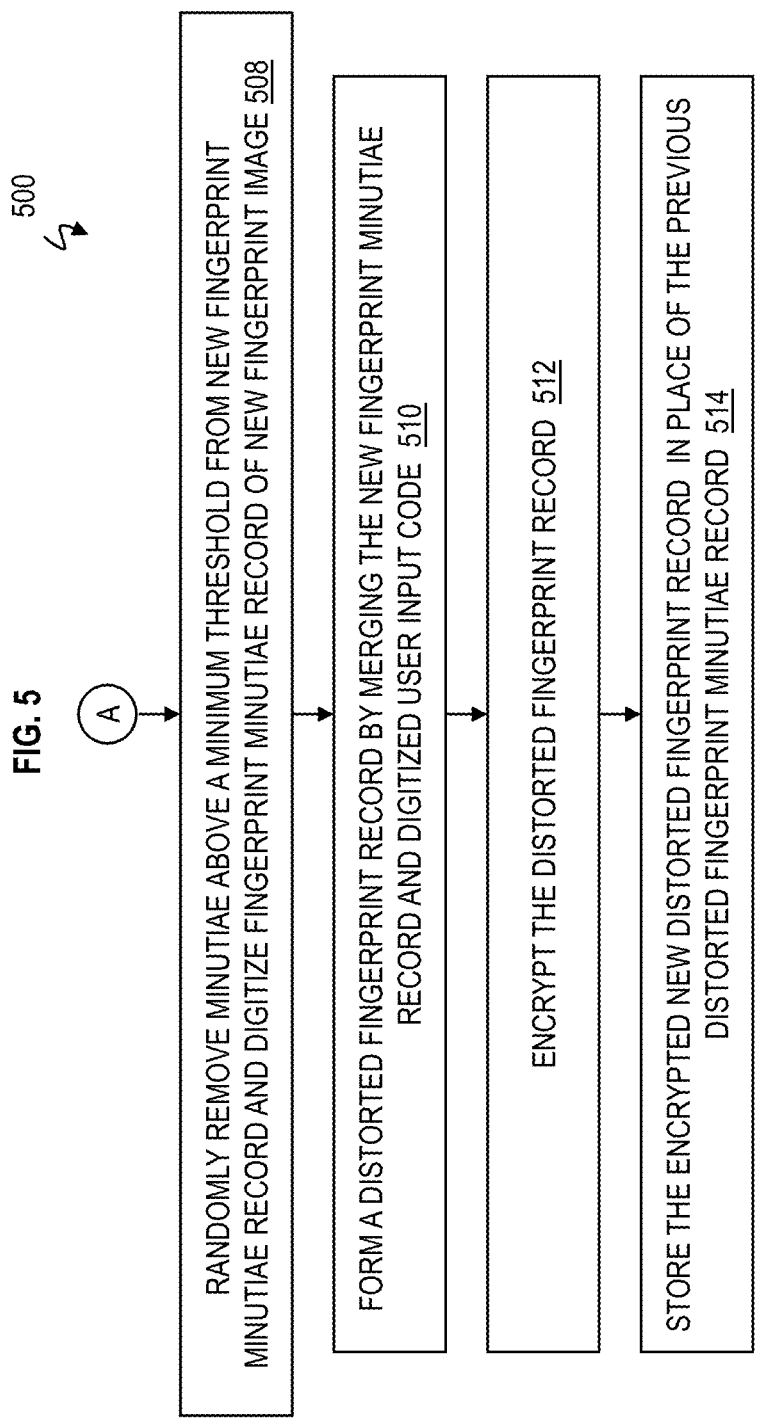
FIG. 5 depicts a flowchart of a process for distorted fingerprint update after successful login/authentication with client side multi-factor password generation for the user in accordance with one or more embodiments of the present invention.

FIG. 5 illustrates a flowchart of a process 500 for distorted fingerprint update after successful login/authentication with client side multi-factor password generation for the user in accordance with one or more embodiments of the present invention. Software applications 204 on computer system 202 are configured to periodically update the distorted fingerprint and/or distorted fingerprint minutiae record. In one or more embodiments, the distorted fingerprint and/or distorted fingerprint minutiae record can be updated upon each successful login. Analogously, blocks 308, 310, 312 are repeated using the new fingerprint image as blocks 508, 510, 512 in FIG. 5. For example, after successful authentication of user 210, software applications 204 on computer system 202 are configured to randomly remove from the new fingerprint minutiae record 240 some and/or all of the minutiae above a minimum minutiae threshold, and subsequently, digitize the new fingerprint minutiae record 240 at block 508. At block 510, software applications 204 on computer system 202 are configured to form a new distorted fingerprint minutiae record 244 by merging the fingerprint minutiae record 240 and the digitized user code (i.e., pin or short password), and software applications 204 encrypt the new distorted fingerprint minutiae record 244 at block 512. At block 514, software applications 204 on computer system 202 are configured to store the encrypted new distorted fingerprint minutiae record 244 in place of the older version of the distorted fingerprint minutiae record 224.

Figure 9:
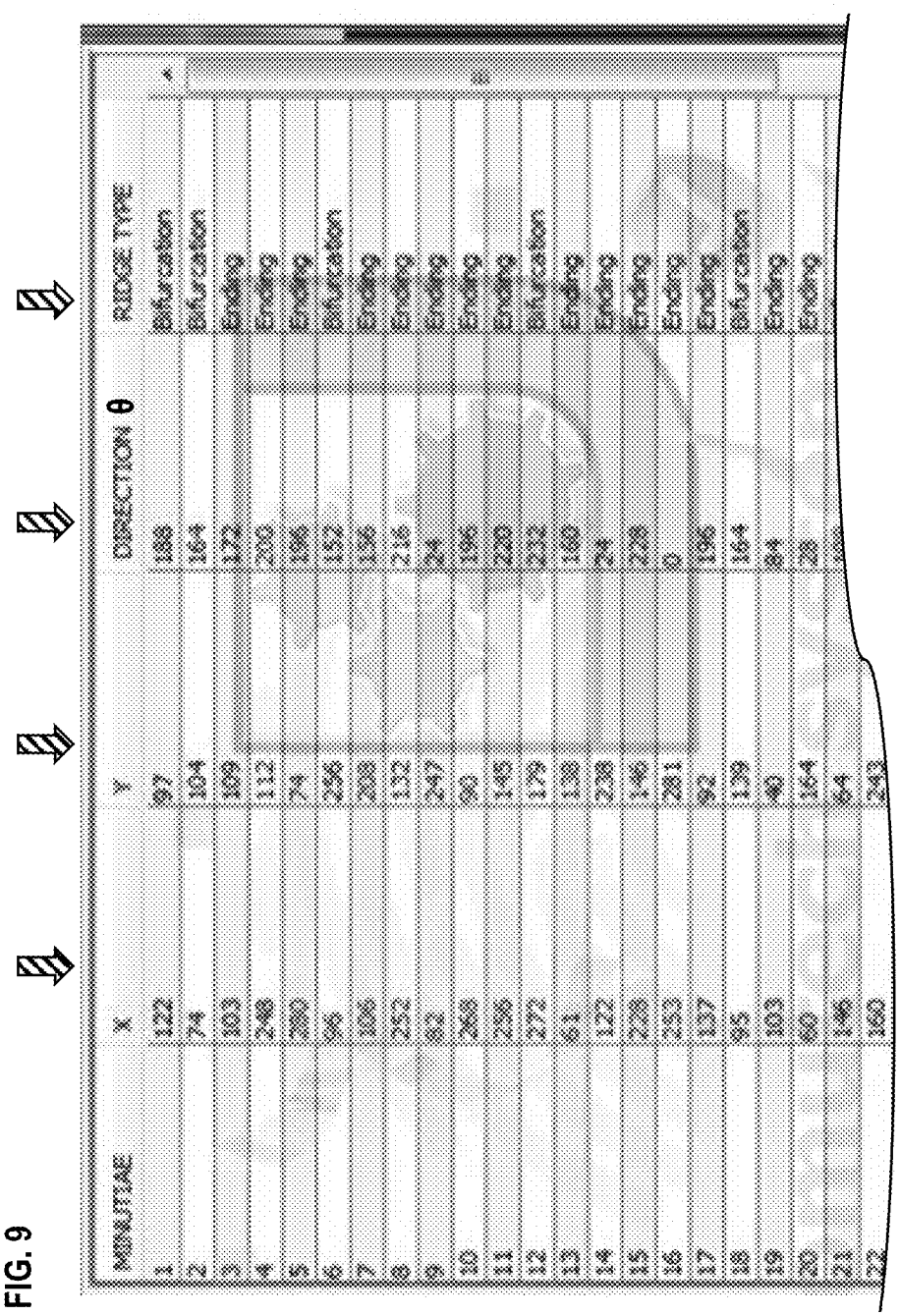
FIG. 9 depicts a partial view of example minutiae fields in the example fingerprint minutiae record in FIG. 8 where block arrows highlight minutiae fields that can be selected for scrambling in accordance with one or more embodiments of the present invention.

Further discussion regarding scrambling minutiae fields is provided below. Striped block arrows are utilized to illustrate example minutiae fields that are available to be scrambled/distorted using the user input code in FIGS. 8 and 9. As noted herein, the scrambling can be a type of fixed format encryption, although other types of encryption may be used. FIG. 8 depicts a partial view of an example fingerprint minutiae record where the striped block arrows highlight one or more fields that can be selected by software applications 204 for scrambling. Software applications 204 may randomly select one or more fields to scramble in FIG. 8. FIG. 9 depicts a partial view of example minutiae fields from the number of n minutiae fields in the example fingerprint minutiae record, where the striped block arrows again highlight one or more minutiae fields that can be selected by software applications 204 for scrambling. Likewise, software applications 204 may randomly select one or more minutiae fields to scramble in FIG. 9.

Turning to further details that are contained in the fingerprint minutiae record and their description of the fingerprint image, a fingerprint is the reproduction of a fingertip epidermis, which is produced when a finger is pressed against a flat surface. The main structural characteristic of a fingerprint is a pattern of interleaved ridges (also called ridgelines) and valleys as depicted in FIG. 11A, which often run in parallel. At a global level, fingerprint patterns usually exhibit one or more regions where the ridgelines assume particular shapes (characterized by high curvature, frequent terminations, and so forth). These regions (called singularities or singular regions) may be classified into three types: loop, delta, and whorl as depicted in FIG. 11B. Singular regions belonging to loop, delta, and whorl types are usually characterized by ∩, Δ, and O shapes, respectively. In FIG. 11B, singular regions are illustrated by white boxes and core points illustrated by small circles in fingerprint images. As shown in FIG. 12, singular regions are commonly used for fingerprint classification, that is, assigning a fingerprint to a class among a set of distinct classes, with the aim of simplifying search and retrieval. FIG. 12 shows the five most common classes of the Galton-Henry classification scheme: Arch, Tented arch, Left loop, Right loop, and Whorl, where the positions of the singularities are graphically marked. (1) Arch fingerprints have ridges that enter from one side, rise to a small bump, and go out the opposite side: no singularity is present. (2) Tented arch fingerprints are similar to the arch, except that some ridgelines exhibit a high curvature, and there are only one loop and one delta (usually vertically aligned). (3) Left (right) loop fingerprints have one or more ridges that enter from the left (right) side, curve back, and exit from the same side they entered; a loop and a delta singularity are present: The loop is typically located on the left (right) side of the delta with respect to a vertical axis. (4) Whorl fingerprints contain two loop singularities (or a single whorl, which may be considered as two opposite loops at the same location) and two delta singularities; the whorl class is the most complex, and in some classification schemes, it is further divided into some subclasses. Several fingerprint matching algorithms (which may be included in software applications 204 and/or employed by software applications 204) pre-align fingerprint images according to a center point (core), typically defined as the position of the northmost loop singularity or as the point of maximum ridgeline curvature for fingerprints belonging to the arch class as depicted in FIG. 11B.

Figure 15C:
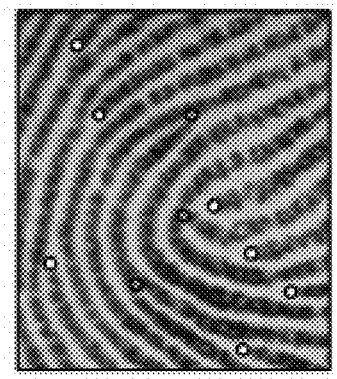
FIG. 15C depicts terminations and bifurcations in accordance with one or more embodiments of the present invention.
Figure 15B:
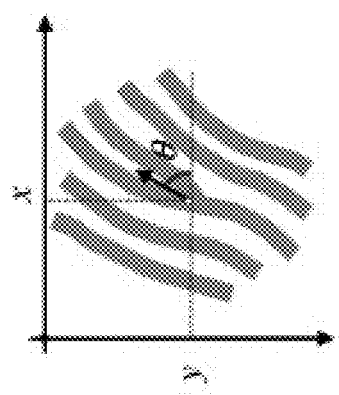
FIG. 15B depicts a bifurcation minutia in accordance with one or more embodiments of the present invention.
Figure 15A:
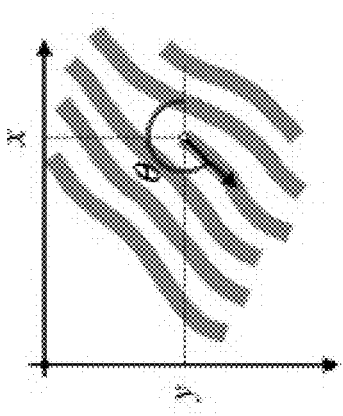
FIG. 15A depicts a termination minutia in accordance with one or more embodiments of the present invention.

From the fingerprint in FIG. 13A, a ridgeline pattern may be effectively described by the orientation image, which is a discrete matrix whose elements denote the local orientation of the ridgelines as depicted in FIG. 13B. The generic element [x, y] of the orientation image is defined as the angle $\varphi_{xy}$ that the tangent to the fingerprint ridges in the corresponding local neighborhood of the image forms with the horizontal axis as depicted in FIG. 14). Analogously, the local ridgeline frequency (defined as the number of ridges per unit length) may be effectively represented by using a frequency image as depicted in FIG. 13C. FIG. 13B is an orientation image of the fingerprint in FIG. 13A, while FIG. 13C is a frequency image the fingerprint where lighter blocks in the frequency image denote regions with a higher frequency. At a finer level, other important features called minutiae can be found. Minutiae are ridgeline discontinuities and may be classified into several types: termination, bifurcation, island, dot, lake, and so forth. Usually, only a coarse classification into two types is adopted as depicted in FIGS. 15A, 15B, 15C, where the two types of classification include termination (the point where a ridge suddenly ends) and bifurcation (the point where a ridge divides into two ridges). A minutia point may be defined by its type, the x and y-coordinates and the direction θ as depicted in FIGS. 15A and 15B. FIG. 15A illustrates a termination minutia, where (x, y) are the minutia coordinates, and θ is defined as the mean direction of the tangents to the two valleys enclosing the termination and is measured increasingly counterclockwise from the horizontal axis to the right. FIG. 15B illustrates a bifurcation minutia, where θ is defined as the mean direction of the tangents to the two ridgelines enclosing the ending valley and is measured increasingly counterclockwise from the horizontal axis to the right. FIG. 15C illustrates terminations (white circles) and bifurcations (gray circles) in a sample fingerprint.

The ISO/IEC 19794-2:2005 standard specifies data formats for minutiae-based fingerprint representation and defines a generic record format that may include one or more templates from one or more finger impressions. The ISO/IEC 19794-2:2005 standard is designed to be used in a wide range of applications where automated fingerprint recognition is involved. The standard defines the relevant terms, describes how to determine minutiae type, position, and orientation, and specifies the formats to be adopted for storing the data. The standard is used for reconstruction of the fingerprint image. The Fingerprint Minutiae Record Format defines the fundamental data elements used for minutiae-based representation of a fingerprint and optional extended data formats for including additional data such as ridge counts and singularities location. The table summarizes the structure of the record and the main fields (including all those relevant to the reconstruction of the fingerprint image. The fingerprint minutiae record contains a Record Header that includes general information (for example, the image size) and the number of fingerprints (Finger Views) represented. For each Finger View, the corresponding Single Finger Record contains minutiae data (mandatory) and extended data (optional). For each minutia, the corresponding Finger Minutia Record (6 bytes) contains the minutia type (termination, bifurcation, or other), where "other" is defined as a minutia type that may be matched with all the types (hence, it may denote both an unknown type or a type other than termination/bifurcation). The Finger Minutia Record contains the minutia x and y position expressed in pixels with respect to the coordinate system and the minutia direction θ measured in FIGS. 15A and 15B and recorded as a single byte in units of 1.40625 (360/256) degrees. Also, the Finger Minutia Record contains the minutia quality in the range 1 (minimum quality) to 100 (maximum quality), or 0 if no quality information is provided. The Extended Data is designed for containing additional information that may be used by the matching algorithm.

There are many technical benefits and advantages of one or more embodiments of the invention include the ability to leverage fixed format encryption, a technique already used with credit cards, to make it much more difficult to gain unauthorized access using brute force techniques when attempting to discover which user input code will undistort the distorted fingerprint minutiae record to produce the actual fingerprint minutiae record because all attempted user input codes will decipher the distorted fingerprint template into what appears to be a legitimate fingerprint minutiae record. The complete end-to-end system and method are innovative. By automatically revoking the previously stored distorted fingerprint minutiae record from the previous fingerprint scan, which was distorted with the user input code and saved during registration, and replacing it with a newly scanned fingerprint having a new distorted fingerprint minutiae records at random times and/or every time (e.g., predetermined intervals), this makes it far more difficult for an unauthorized person to simply run through all user input codes and then analyze the results to attempt to identify the most likely actual fingerprint minutiae record. Randomly removing (or altering) some fingerprint minutiae to produce more unique but still valid fingerprint images increases robustness against unauthorized access.

Figure 10:
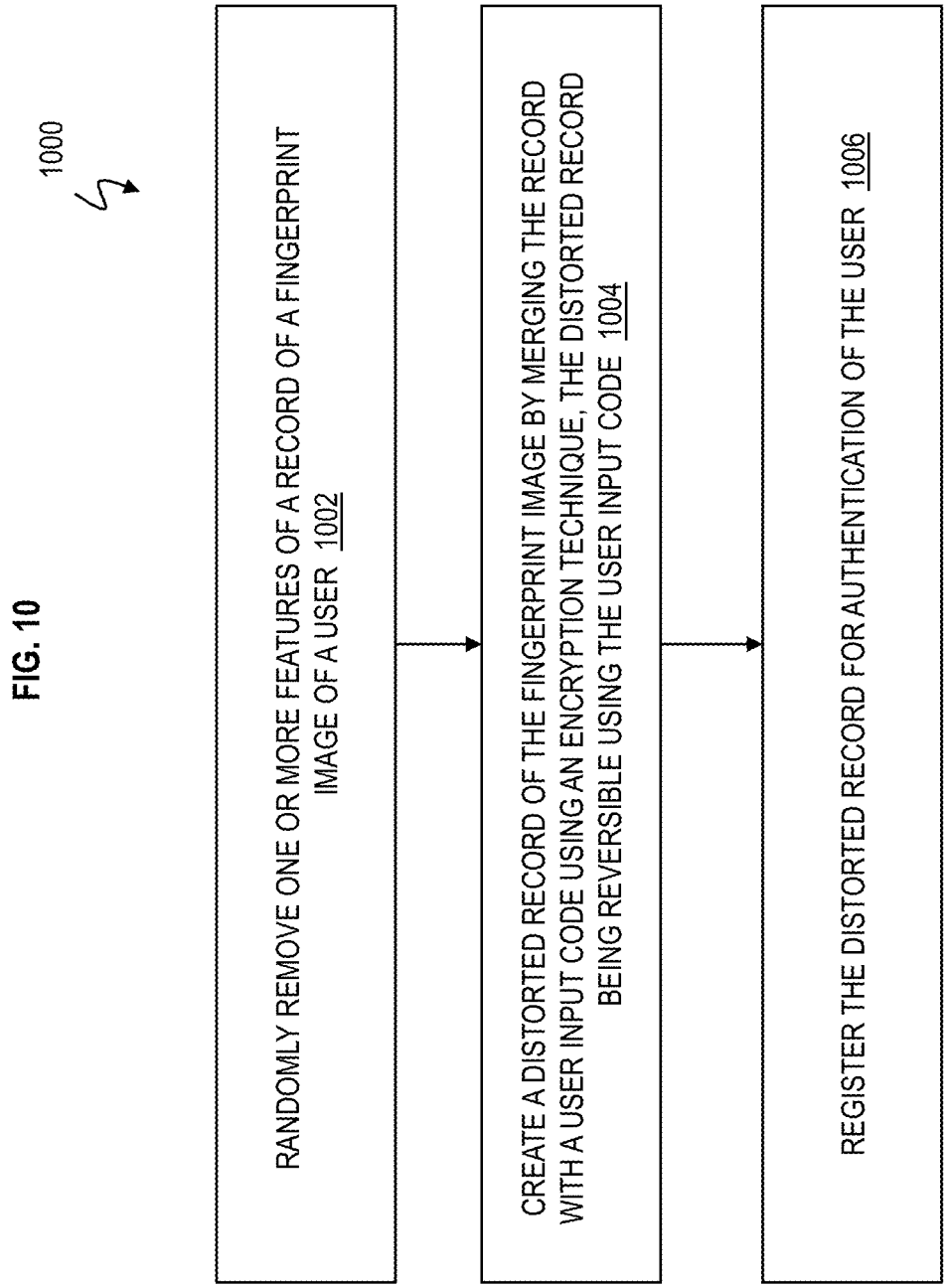
FIG. 10 depicts a flowchart of a computer-implemented method for client side multi-factor password generation, authentication, and/or update in accordance with one or more embodiments of the present invention.

FIG. 10 is a flowchart of a computer-implemented method 1000 for client side multi-factor password generation, authentication, and update in accordance with one or more embodiments of the present invention. At block 1002, software applications 204 on computer systems 202 are configured to randomly remove one or more features of a record (e.g., fingerprint minutiae record 220) of a fingerprint image of a user 210. At block 1004, software applications 204 on computer systems 202 are configured to create a distorted record (e.g., distorted fingerprint minutiae record 224) of the fingerprint image by merging the record with a user input code (e.g., input code 0486) using an encryption technique, the distorted record being reversible using the user input code. At block 1006, software applications 204 on computer systems 202 are configured to register the distorted record for (subsequent) authentication of the user 210.

Creating the distorted record of the fingerprint image further comprises translating the record of the fingerprint image into a string (e.g., fields of fingerprint minutiae record 220 can be translated in to strings), digitizing the user input code (e.g., 0486) into another string, and merging the string with the another string. The user input code is not stored locally on computer system 202 and/or remotely on other computer systems. The fingerprint image is not stored locally on computer system 202 and/or remotely on other computer systems. Responsive to receiving a new fingerprint input by the user, software applications 204 on computer systems 202 are configured to update the distorted record (e.g., distorted fingerprint minutiae record 224) with a new distorted record (e.g., new distorted fingerprint minutiae record 244) of the new fingerprint. The distorted record is continually/automatically updated with a new distorted record of a new fingerprint at a predetermined interval such as after each successful authentication, after a predetermined number of successful authentications, on a periodic calendar basis (e.g., weekly, monthly, etc.), etc. Responsive to receiving a new fingerprint input by the user and the user input code, software applications 204 are configured to retrieve the distorted record (e.g., distorted fingerprint minutiae record 224), decrypt the distorted record of the fingerprint image with the user input code (e.g., user input code 0486) to result in the string, convert the string back to the record of the fingerprint image, and compare the record of the fingerprint image to a new record of the new fingerprint. Software applications 204 are configured to determine that a successful authentication occurred when the record matches the new record of the new fingerprint, i.e., when the (previously stored) fingerprint minutiae record 220 matches the new fingerprint minutiae record 240, and determine that an unsuccessful authentication occurred when the record does not match the new record of the new fingerprint.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 16:
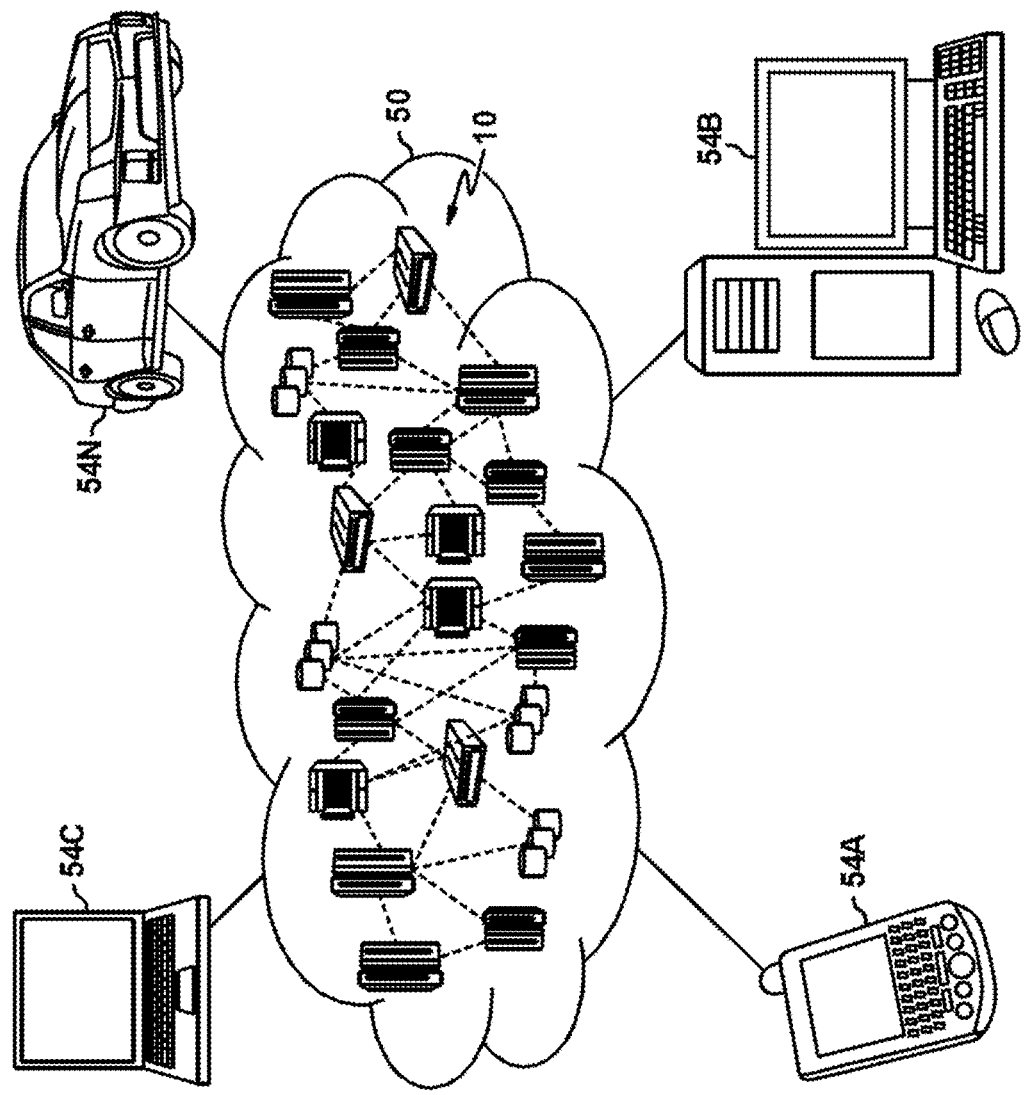
FIG. 16 depicts a cloud computing environment according to one or more embodiments of the present invention.

Referring now to FIG. 16, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 16 are intended to be illustrative only and that computing nodes 10 and cloud computing environment 50 can communicate with any type of computerized device over any type of network and/or network addressable connection (e.g., using a web browser).

Figure 17:
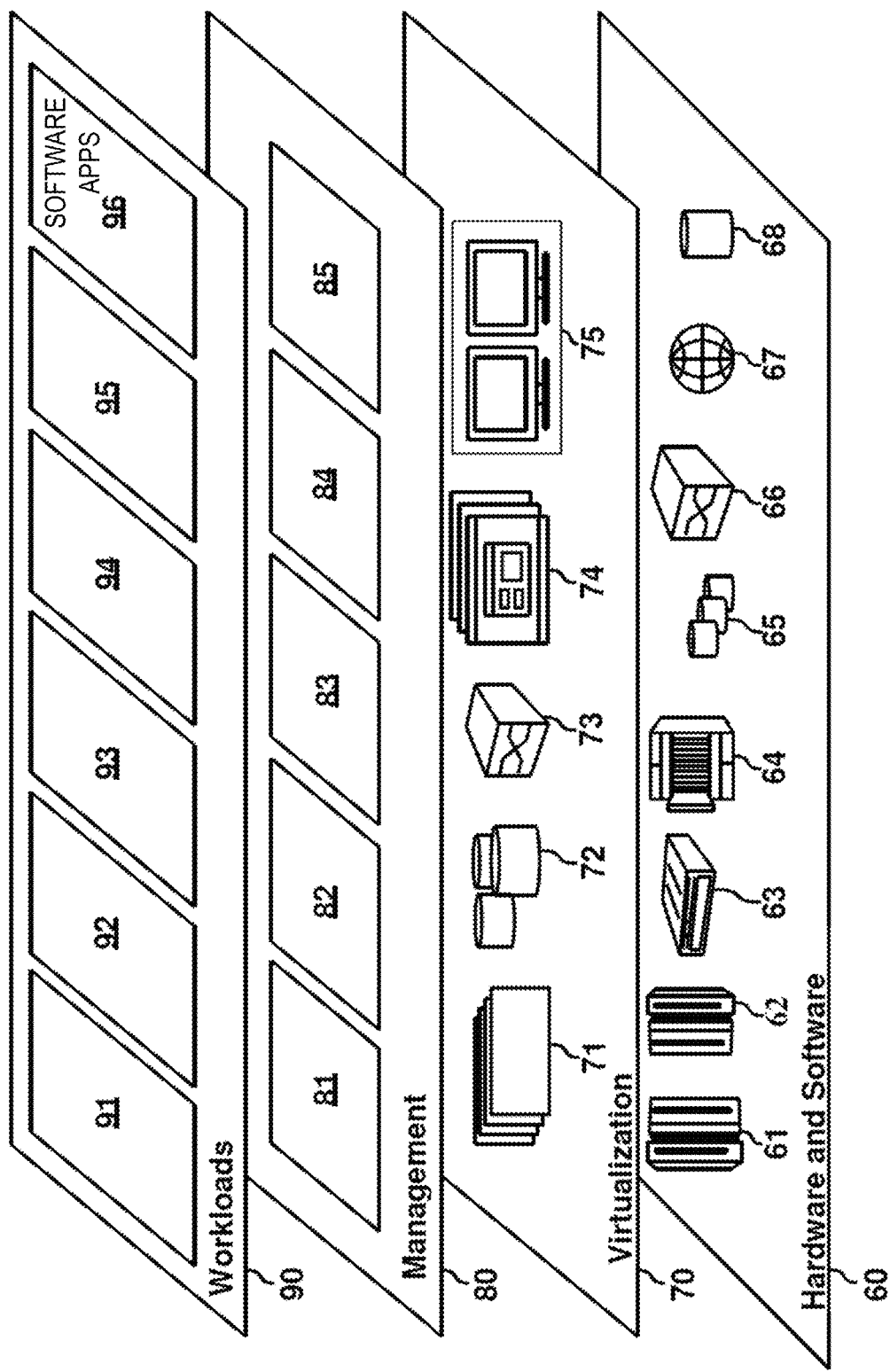
FIG. 17 depicts abstraction model layers according to one or more embodiments of the present invention.

Referring now to FIG. 17, a set of functional abstraction layers provided by cloud computing environment 50 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., software applications 204, encryption/decryption algorithms, etc.) implemented in workloads and functions 96.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
randomly removing one or more minutiae fields of a plurality of minutiae fields of a record of a fingerprint image of a user resulting in an updated plurality of minutiae fields remaining in the record, wherein the randomly removing continues until a fewer number of the updated plurality of minutiae fields meets a predefined minimum threshold;
creating a distorted record of the record having the updated plurality of minutiae fields, the creating comprising merging at least one of the updated plurality of minutiae fields of the record with at least a portion of a user input code using an encryption technique, without merging other minutiae fields of the updated plurality of minutiae fields with the user input code, the distorted record being reversible using the user input code, wherein the least one of the updated plurality of minutiae fields has a modified value in the distorted record; and
registering the distorted record for authentication of the user.

2. The computer-implemented method of claim 1, wherein creating the distorted record of the fingerprint image further comprises translating the record of the fingerprint image into a string, digitizing the user input code into another string, and merging the string with the another string.

3. The computer-implemented method of claim 1,
wherein the encryption technique comprises fixed format encryption.

4. The computer-implemented method of claim 1, further comprising receiving a new fingerprint input by the user; and
updating the distorted record with a new distorted record of the new fingerprint.

5. The computer-implemented method of claim 1, wherein the distorted record is automatically updated with a new distorted record of a new fingerprint of the user at a predetermined interval.

6. The computer-implemented method of claim 1, further comprising receiving a new fingerprint input by the user and the user input code;
retrieving the distorted record;
decrypting the distorted record of the fingerprint image with the user input code to result in a string;
converting the string back to the record of the fingerprint image; and
comparing the record of the fingerprint image to a new record of the new fingerprint.

7. The computer-implemented method of claim 6, further comprising determining that a successful authentication occurred when the record matches the new record of the new fingerprint; and
determining that an unsuccessful authentication occurred when the record does not match the new record of the new fingerprint.

8. A system comprising:
a memory having computer readable instructions; and
one or more processors for executing the computer readable instructions, the computer readable instructions controlling the one or more processors to perform operations comprising:
randomly removing one or more minutiae fields of a plurality of minutiae fields of a record of a fingerprint image of a user resulting in an updated plurality of minutiae fields remain in the record, wherein the randomly removing continues until a fewer number of the updated plurality of minutiae fields meets a predefined minimum threshold;
creating a distorted record of the record having the one or more minutiae fields of the updated plurality of minutiae fields, the creating comprising merging at least one of the updated plurality of minutiae fields of the record with at least a portion of a user input code using an encryption technique, without merging other minutiae fields of the updated plurality of minutiae fields with the user input code, the distorted record being reversible using the user input code, wherein the least one of the updated plurality of minutiae fields has a modified value in the distorted record; and
registering the distorted record for authentication of the user.

9. The system of claim 8, wherein creating the distorted record of the fingerprint image further comprises translating the record of the fingerprint image into a string, digitizing the user input code into another string, and merging the string with the another string.

10. The system of claim 8,
wherein the encryption technique comprises fixed format encryption.

11. The system of claim 8, further comprising receiving a new fingerprint input by the user; and
updating the distorted record with a new distorted record of the new fingerprint.

12. The system of claim 8, wherein the distorted record is automatically updated with a new distorted record of a new fingerprint of the user at a predetermined interval.

13. The system of claim 8, further comprising receiving a new fingerprint input by the user and the user input code;
retrieving the distorted record;
decrypting the distorted record of the fingerprint image with the user input code to result in a string;
converting the string back to the record of the fingerprint image; and
comparing the record of the fingerprint image to a new record of the new fingerprint.

14. The system of claim 13, further comprising determining that a successful authentication occurred when the record matches the new record of the new fingerprint; and
determining that an unsuccessful authentication occurred when the record does not match the new record of the new fingerprint.

15. A computer program product comprising a computer readable storage medium having program instructions embodied therewith, the program instructions executable by a processor to cause the processor to perform operations comprising:
randomly removing one or more minutiae fields of a plurality of minutiae fields of a record of a fingerprint image of a user resulting in an updated plurality of minutiae fields remaining in the record, wherein the randomly removing continues until a fewer number of the updated plurality of minutiae fields meets a predefined minimum threshold;
creating a distorted record of the record having the one or more minutiae fields of the updated plurality of minutiae fields, the creating comprising merging at least one of the updated plurality of minutiae fields of the record with at least a portion of a user input code using an encryption technique, without merging other minutiae fields of the updated plurality of minutiae fields with the user input code, the distorted record being reversible using the user input code, wherein the least one of the updated plurality of minutiae fields has a modified value in the distorted record; and registering the distorted record for authentication of the user.

16. The computer program product of claim 15, wherein creating the distorted record of the fingerprint image further comprises translating the record of the fingerprint image into a string, digitizing the user input code into another string, and merging the string with the another string.

17. The computer program product of claim 15, wherein the encryption technique comprises fixed format encryption.

18. The computer program product of claim 15, further comprising receiving a new fingerprint input by the user; and updating the distorted record with a new distorted record of the new fingerprint.

19. The computer program product of claim 15, wherein the distorted record is automatically updated with a new distorted record of a new fingerprint of the user at a predetermined interval.

20. The computer program product of claim 15, further comprising receiving a new fingerprint input by the user and the user input code;

retrieving the distorted record;

decrypting the distorted record of the fingerprint image with the user input code to result in a string;

converting the string back to the record of the fingerprint image; and comparing the record of the fingerprint image to a new record of the new fingerprint.

\* \* \* \* \*